(12) United States Patent
Lashlee et al.

(10) Patent No.: US 6,364,424 B1
(45) Date of Patent: Apr. 2, 2002

(54) PORTABLE WHEEL ASSEMBLY

(76) Inventors: Edward Jacob Lashlee; Ryan Jacob Lashlee, both of 219 Broadway, #400, Laguna Beach, CA (US) 92651; John L. Wood, 19586 Dorado Dr., Trabuco Canyon, CA (US) 92679

( * ) Notice: Subject to any disclaimer, the term of this patent is extended or adjusted under 35 U.S.C. 154(b) by 0 days.

(21) Appl. No.: 09/491,687

(22) Filed: Jan. 26, 2000

Related U.S. Application Data (60) Provisional application No. 60/117,453, filed on Jan. 26, 1999.

(51) Int. Cl.$^7$ .................................................. B60B 3/10
(52) U.S. Cl. ...................... 301/63.1; 301/65; 301/110.5; 280/287
(58) Field of Search ............................... 301/64.7, 63.1, 301/30, 31, 62, 64.1, 64.2, 64.3, 64.6, 65, 66, 79, 110.5, 110.6; 280/278, 287

(56) References Cited

U.S. PATENT DOCUMENTS

| | | | |
|---|---|---|---|
| 1,473,694 A | * | 11/1923 | Barry |
| 1,546,954 A | * | 7/1925 | Tischer |
| 1,578,175 A | * | 3/1926 | Rodgers, Jr. |
| 1,627,717 A | * | 5/1927 | Trout et al. |
| 3,019,056 A | * | 1/1962 | Keilman |
| 3,635,529 A | * | 1/1972 | Nass ............................. 301/65 |
| 3,653,718 A | * | 4/1972 | Gellender .................. 301/38.1 |
| 4,127,166 A | | 11/1978 | Wyman ....................... 152/323 |
| 4,982,990 A | * | 1/1991 | Bongers et al. ............... 301/31 |
| 5,205,573 A | | 4/1993 | Mhedbi ...................... 280/287 |
| 5,456,482 A | | 10/1995 | Rau ........................... 280/283 |
| 5,551,763 A | * | 9/1996 | Alsman ..................... 301/64.7 |

* cited by examiner

Primary Examiner—Kevin Hurley
(74) Attorney, Agent, or Firm—Christie, Parker & Hale, LLP (57) ABSTRACT

A portable wheel assembly for use with bicycles and other wheeled vehicles. The wheel assembly comprises a centrally positioned hub which is adapted for rotatable movement about an axis. A plurality of pie shaped disk segments are coupled together along their radial side edges to form a circular support disk with a central opening. Each disk segment is adapted to removably couple with the hub at its innermost radial edge and extends radially outwardly to form a portion of a circular rim at its outermost radial edge. The rim is adapted for supporting a tire. The tire comprises a non-pneumatic tire with an annular ridge which is adapted to couple with the circular rim formed by the disk. During assembly, each of the pie shaped disk segments is coupled together and then coupled to the hub assembly at the inside radial edge or central opening. As the disk segments are coupled to the hub, the tire is assembled onto the outer radial edge or rim. Securing the supporting disk structure to the hub also secures the tire to the rim.

11 Claims, 11 Drawing Sheets

PORTABLE WHEEL ASSEMBLY

PRIORITY CLAIM

The present invention claims the benefit of the priority date of U.S. Provisional Application Ser. No. 60/117,453, filed on Jan. 26, 1999, and entitled PORTABLE WHEEL ASSEMBLY, the entire disclosure of which is expressly incorporated herein by reference.

FIELD OF THE INVENTION

This invention relates to a portable wheel assembly and more particularly, to a portable wheel assembly used primarily on bicycles, wheelchairs and other vehicles. The portable wheel assembly can be reduced in size to a compact arrangement for storage or transportation.

BACKGROUND

Traditionally, the transportation of vehicles such as bicycles, wheelchairs and the like has been generally difficult and even limited due to their size and weight. In particular, bicycles are often not transported even though desirable, because of their overall size, weight and bulkiness. The transportation of a wheelchair often requires a second person to assist the user during loading and unloading into the transportation vehicle due to the weight and bulkiness. In an effort to overcome these problems, portable bicycles, wheelchairs and similar portable vehicles have been developed. Many of these portable vehicles utilize frame sections which are collapsible into smaller sections. These collapsible sections allow a user to reduce the overall bulkiness of the bicycle by shortening the length of the major frame members. One problem with this type of portable bicycle has been the ability to make these collapsible components simple to use and yet rigid and strong when assembled. In addition, even though the frame is reduced in size, the wheels remain bulky and difficult to store or carry.

Portable bicycles which utilize small and easily removable wheels are also known in the prior art. The problem with these bicycles, and also wheelchairs, is that the smaller wheels have major disadvantages relative to more conventional full size wheels. For example, smaller wheels move a shorter distance of travel per rotation of the pedal or wheel and increase the rotations per minute when compared to a larger wheel. Smaller wheels generally have a lower maximum speed than larger wheels and are often believed to allow less control.

Wheel assemblies for use on bicycles, wheelchairs and the like, which can be disassembled into smaller components are also known in the prior art. For example, U.S. Pat. No. 5,205,573 to Sghaier, the contents of which are incorporated herein by reference, discloses a bicycle that can be disassembled and stored into a compact arrangement. However, the disclosed collapsible wheel uses a plurality of spokes. In order to support the weight of a person, the spokes need to be large and will thus decrease the performance of the bicycle. Also, a single spoke supporting the weight of a rider increases the danger to the rider, should the spoke break. Multiple smaller spokes will decrease the danger, but will increase the assembly time of the wheel.

Thus, there is a need for a full size wheel that can be disassembled in a compact arrangement, yet be quickly assembled while maintaining the performance and characteristics of a permanent full size wheel assembly. There is also a need for a portable vehicle, such as a bicycle, which can be used with the above mentioned portable wheel assemblies, such that in the compact arrangement it can be easily carried and stored.

SUMMARY OF THE INVENTION

The present invention solves these problems of the prior art by providing a portable wheel assembly that can be quickly and easily assembled and disassembled and yet maintains the strength and performance of a more conventional full size wheel assembly. According to the present invention, a portable wheel assembly is provided for coupling with a tire and a framed vehicle such as a bicycle, wheelchair, unicycle or the like and that can be disassembled and stored in a compact arrangement. The portable wheel assembly comprises a hub assembly which is adapted for generally conventional rotatable movement about an axis. A first plurality of pie shaped disk segments are removably interlocked together along their radial sides to form a first circular support disk. Each of these first disk segment are removably coupled to a first side of the hub assembly at an inner radial edge. The disk segments are coupled together and extend radially outwardly from the hub assembly to form a circumferential first rim edge along their outer radial edge.

A second plurality of pie shaped disk segments are removably interlocked together along their radial sides to form a second circular support disk. This second support disk is concentrically aligned and opposes the first support disk. Each second disk segment is removably coupled to a second side of the hub assembly at an inner radial edge and extends radially outwardly from the hub assembly to form a circumferential second rim edge along their outer radial edge. The first and second rim edges being spaced apart and adapted to couple with the tire. In addition, each support disk includes a curved or fulcrum portion which contacts the opposing fulcrum portion during installation onto the hub assembly. First and second locking ring are used to removably secure the respective inner radial edges of the first and second disk segments to the respective first and second sides of the hub assembly.

In another aspect of the present invention, the portable wheel assembly includes a tire. The tire is coupled to the rim edges. The tire comprises a circular groove along its inside or inner circumferential surface. A pair of spaced apart and integral tension members are aligned adjacent each circular side of the circumferential groove. A plurality of spaced apart retaining clips are integrally formed within the tire and are coupled to the tension member. During assembly of the tire onto the rim, when the first and second rim edges are inserted into the circular groove and when the first and second support disks are attached to the hub assembly, this causes the opposing fulcrum portions of the support disks to contact each other and forcibly move the rim edges outwardly to securely engage within the circular groove. The wheel assembly can be collapsed or disassembled by unclamping the opposing support disks from each other and thus, uncoupling each disk from the hub assembly and uncoupling the support segment from each other. In a preferred embodiment, the tire is used to further clamp the disks segments together. The tire is made of flexible synthetic rubber with multiple retaining clips molded into the interior. The tire is a non-pneumatic tire, but includes a closed annular passageway for ride cushioning.

In yet another aspect of the present invention, a portable bicycle capable of being quickly assembled and disassembled is described. The portable bicycle includes a frame assembly that can be folded or disassembled into a compact arrangement, and the wheel assembly can be collapsed or disassembled into multiple pie shaped components and the tires removed. In addition, a compact travel or storage case is adapted for specifically carrying the disassembled bicycle and wheel assembly.

The portable bicycle comprises a frame assembly having a plurality of interconnected tubular frame members with at least some of the frame members being structurally coupled together through pivotable joints that are lockable to form rigid and safe frame members. A front portable wheel assembly is removably coupled to the frame assembly in a generally conventional fashion through the axis. The front wheel assembly includes a front hub assembly and also includes a plurality of removable disc segments that are coupled together to form a pair of opposing structural support disks which extend radially outward from the hub assembly to form a front rim. A front tire having an integral circular groove is coupled with the front rim.

A rear portable wheel assembly is also removably coupled to the frame assembly in a generally conventional fashion through a rear axis. The rear wheel assembly has a rear hub assembly and includes a plurality of removable disc segments coupled together to form a second pair of structural support disks which form a rear rim. A rear tire having an integral circular groove is coupled with the rear rim.

A handlebar assembly is rotatably coupled to the frame assembly. A pedal assembly is also rotatably coupled to the frame assembly in a conventional location. A chain is coupled between the pedal assembly and the rear hub for transferring power from the pedals to the rear wheel assembly.

These and other features and advantages of the invention will be apparent to those of ordinary skill in the art in view of the detailed description of the preferred embodiments, which is made with reference to the drawings, a brief description of which is provided below.

DETAILED DESCRIPTION OF THE INVENTION

Figure 1:
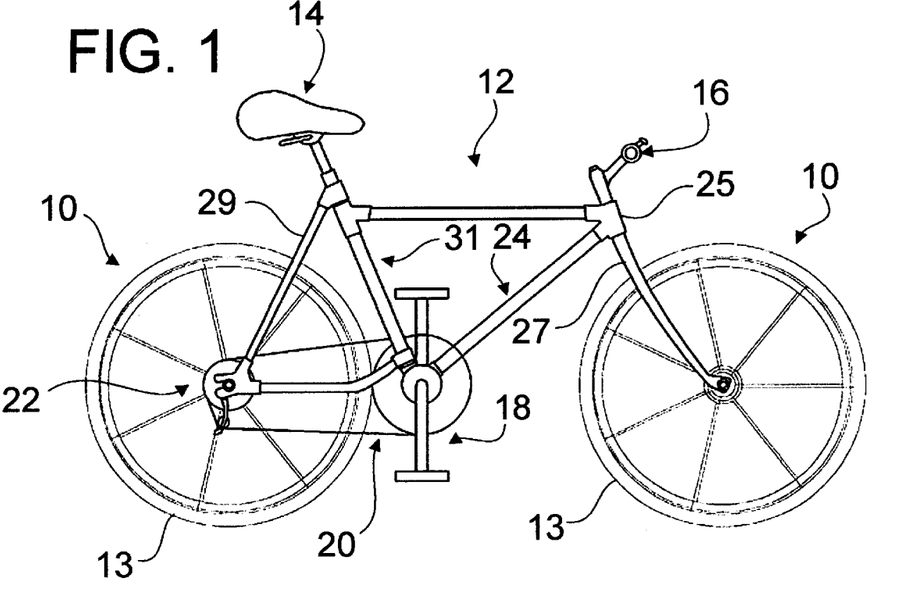
FIG. 1 is a semi-schematic side view of an embodiment of a portable bicycle constructed according to the principles of the present invention.

Referring now to the drawings, wherein like reference numerals designate like parts throughout the several views and embodiments, a portable wheel assembly is illustrated in FIG. 1 and designated by reference numeral 10. As shown, a pair of portable wheel assemblies 10 of the present invention are mounted to a portable bicycle assembly 12 of the present invention. The wheels 10 are fitted with a soft tire 13. As conventionally known, the portable bicycle 12 includes, among other conventional components, a removable seat assembly 14, handlebars 16, a pedal assembly 18, a chain 20 and a gear assembly 22.

Figure 2:
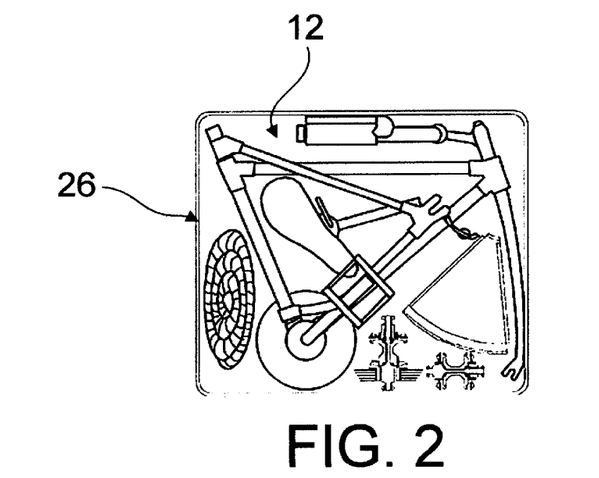
FIG. 2 is a semi-schematic top, cut-away, view of the portable bicycle of FIG. 1, showing the bike in a collapsed configuration and stored in a carrying case according to the present invention.

In addition to the generally conventional components, the portable bicycle 12 of the present invention includes a collapsible frame assembly 24. As will be described in greater detail below, both the wheel assemblies 10 and the frame assembly 24 allow for quick disassembly into a much smaller overall size. For example, FIG. 2 shows a top, cut-away, view of the portable bicycle 12 in a collapsed configuration and stored in a carrying case 26 which is preferably specifically adapted to support the collapsed bike.

Figure 3:
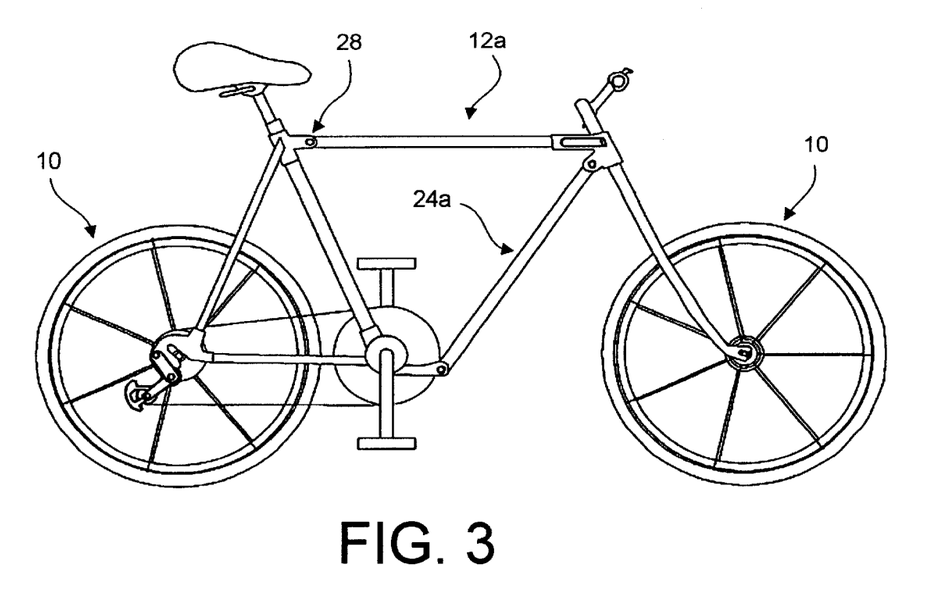
FIG. 3 is a semi-schematic side view of another embodiment of a portable bicycle constructed according to the principles of the present invention.
Figure 17:
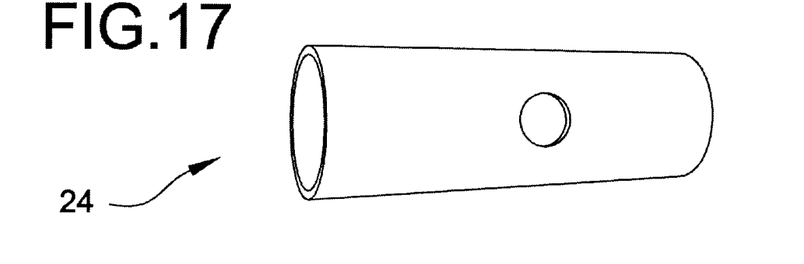
FIG. 17 is a semi-schematic perspective view of an embodiment of a structural frame assembly member of the present invention.
Figure 18A:
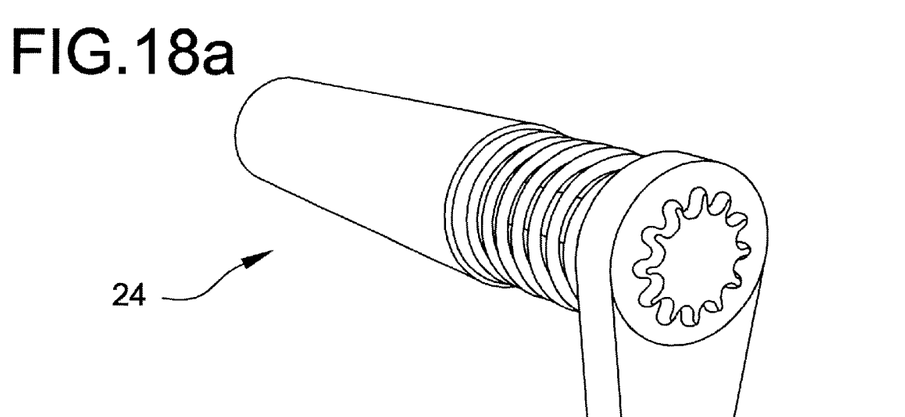
FIGS. 18a–18b are semi-schematic fragmentary perspective views of the frame assembly of the portable bicycle of the present invention showing various embodiments of various folding structural joints comprising the frame assembly.
Figure 18B:
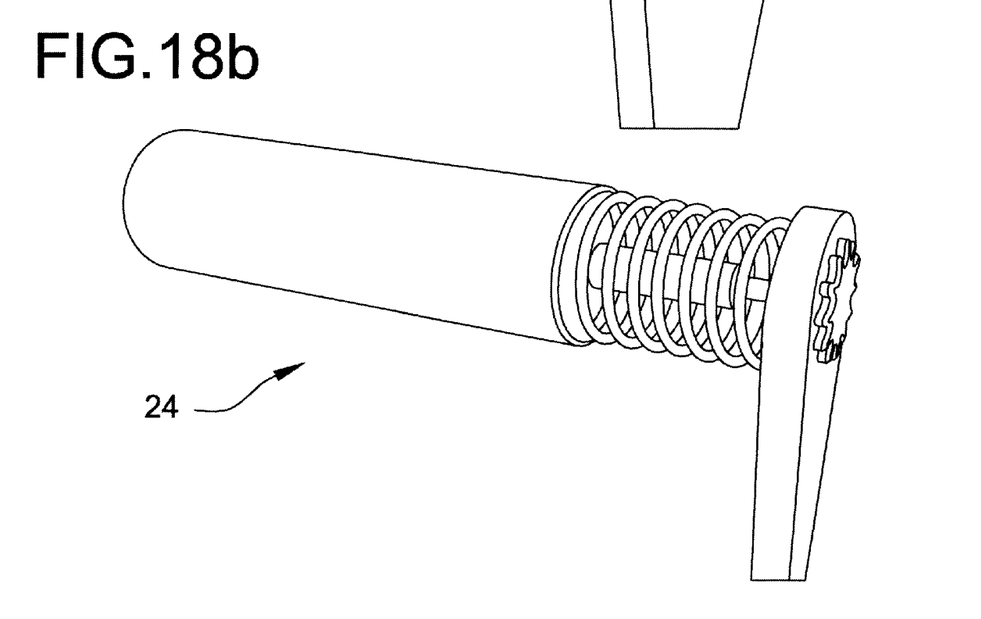

As illustrated in FIGS. 1 and 3 as well as in FIGS. 16 through 18, the bicycle frame 24 includes a head tube 25 which pivotally supports a pair of spaced apart front wheel forks 27 in a generally conventional fashion. The illustrated handlebar 16 is collapsible, although a conventional rigid handlebar may also be used, and connected to the front fork 27. A pair of spaced apart rear forks 29 extend downwardly from the frame body 24 and connect to a rear wheel assembly 10. As illustrated, the rear wheel assembly 10 includes a gear hub assembly 22. However, the rear wheel may also be a conventional bicycle wheel as commonly known. The seat assembly 14 is removably connected to the top portion of the frame body 24. The illustrated pair of pedals 18 are foldably connected to the pedal crank assembly. However, a conventional set of pedals may also be used.

Figure 4:
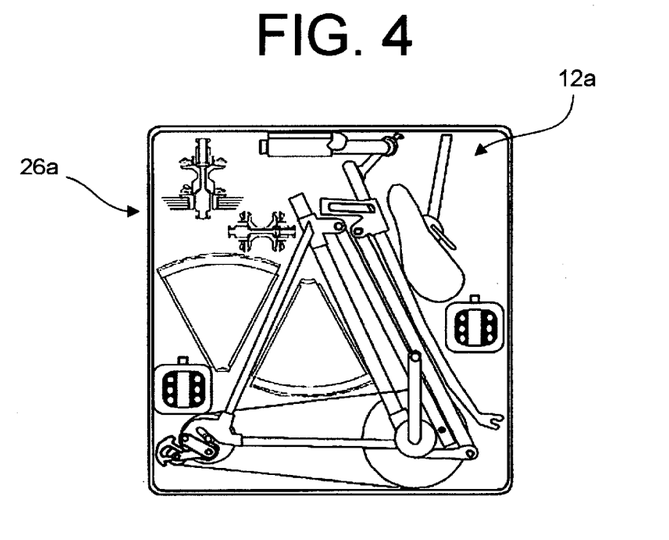
FIG. 4 is a semi-schematic top, cut-away, view of the portable bicycle of FIG. 3, showing the bike in a collapsed configuration and stored in a carrying case according to the present invention.

Referring now to FIGS. 3–4, a different embodiment of the present bicycle 12a is shown. In this embodiment, the bike frame 24a includes a number of pivot sections 28. As before, a pair of portable wheel assemblies 10 are coupled to the frame 12a. FIG. 4 shows the portable bicycle 12a in the disassembled or collapsed configuration and stored in a carrying case 26a of the present invention;

A preferred embodiment of the present invention is a combination of at least one of the portable wheel assembly 10, such as a front portable wheel assembly and a collapsible vehicle frame, such as the illustrated and described bicycle frame 24. While the example of a collapsible vehicle used here is a bicycle, other collapsible vehicles may benefit from the use of the present portable wheel assembly 10. Examples of other vehicles include unicycles, tandem bicycles, tricycles, wheel chairs, collapsible carts, and the like. These portable vehicles may utilize a conventional frame assembly or alternatively, a frame assembly that is collapsible in a fashion similar to the bike frame 12.

Referring now to FIGS. 5 through 13, an embodiment of the portable wheel assembly 10 according to the principles of the present invention will be described in greater detail. In particular a portable wheel assembly without a gear will be described. Such a wheel may, for example, be a front bicycle wheel. However, the same principles would apply to a similar portable wheel assembly with an incorporated gear, gear assembly or other drive mechanisms.

As illustrated, the portable wheel assembly 10 comprises a plurality of wheel disk segments 17 coupled to a front hub 19. As discussed, the front wheel assembly 10 and rear wheel assembly differ only in that the rear wheel assembly includes a gear hub 22. The tire 13 is removably attached to the outer radial peripheral edge of the disk segments 17. For purposes of this application, the term tire is intended to include any material at the perimeter that will aid in absorbing road shock and/or provide a better contact with a contacting surface. This will include both pneumatic and non-pneumatic tires, and rubber, polymers or similar materials. The tire 13 may be permanently or removably attached to the outer perimeter edge of the disk segments 17. In addition, the tire 13 preferably includes an annular air chamber 21 or inner tube for such purpose.

Figure 14:
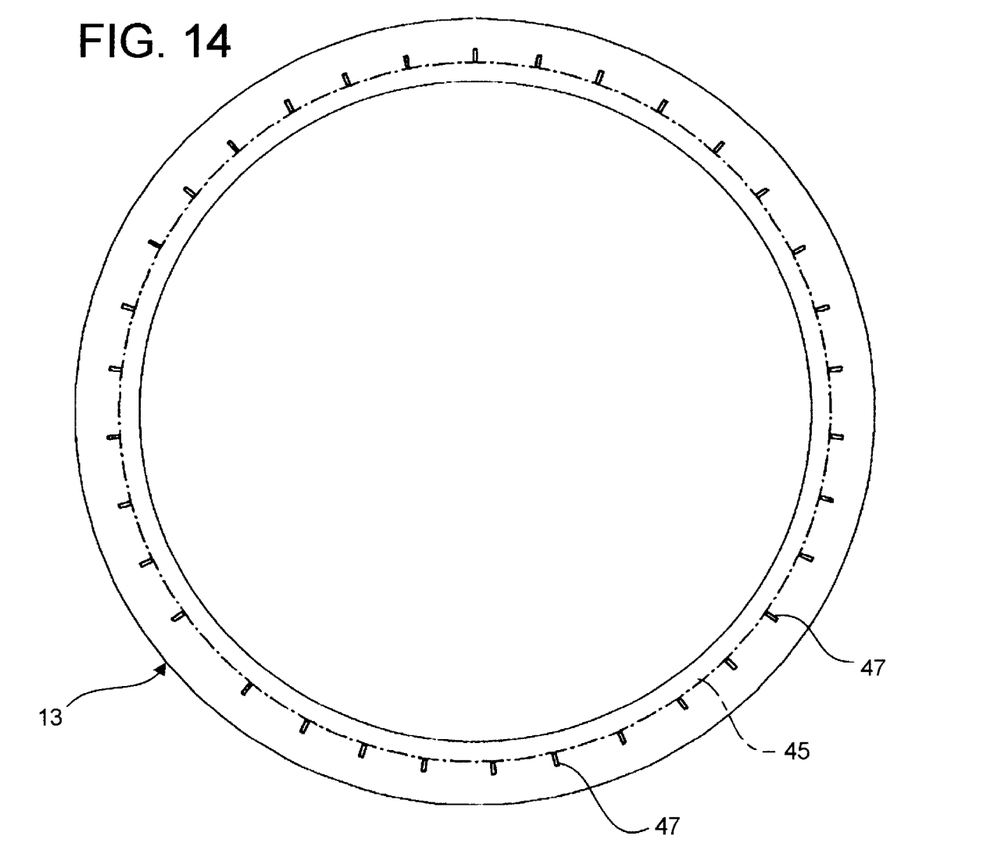
FIG. 14 is a semi-schematic perspective view of an embodiment of a non-pneumatic tire assembly constructed according to the principles of the present invention.
Figure 15:
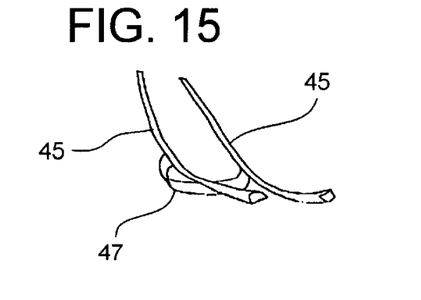
FIG. 15 is a semi-schematic fragmentary perspective view showing a retaining clip and cable.
Figure 16A:
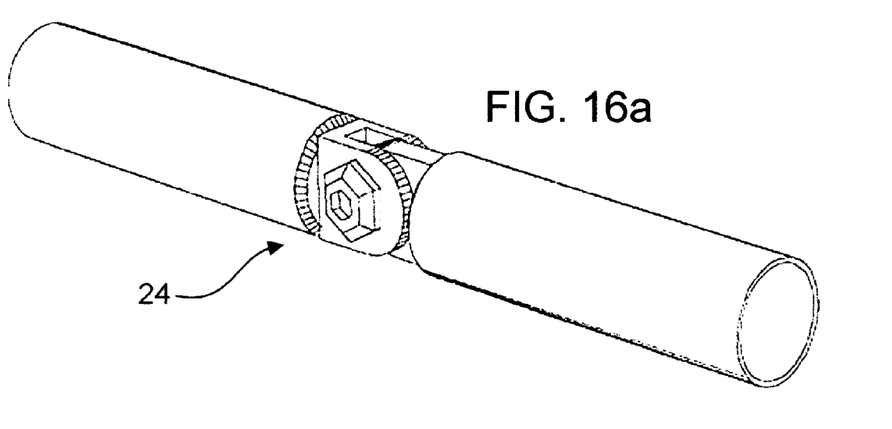
FIGS. 16a–16e are semi-schematic fragmentary perspective views of the frame assembly of the portable bicycle of the present invention showing various embodiments of folding structural joints comprising the frame assembly.
Figure 16B:
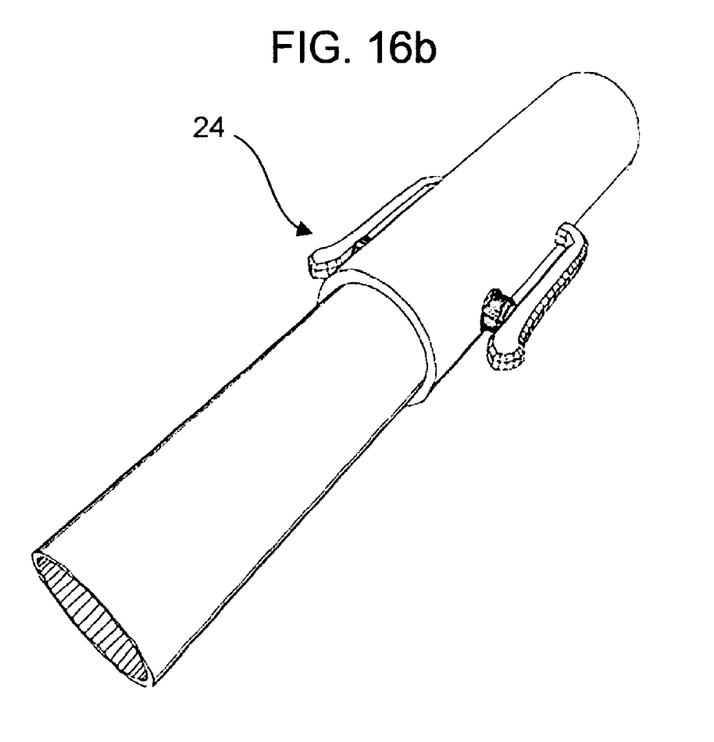
Figure 16C:
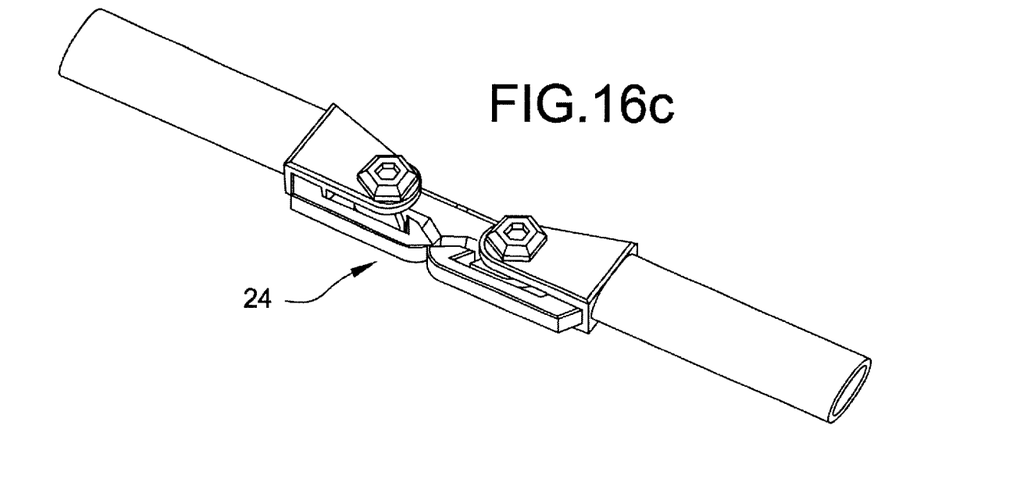
Figure 16D:
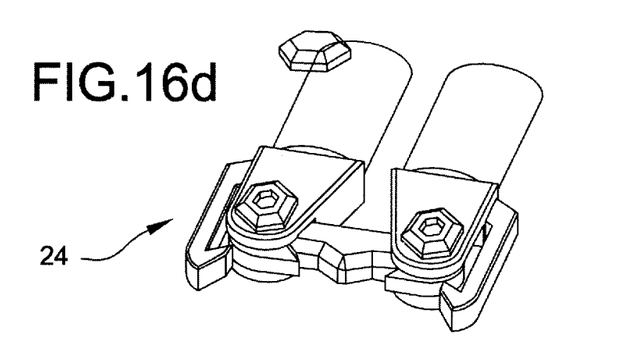
Figure 16E:
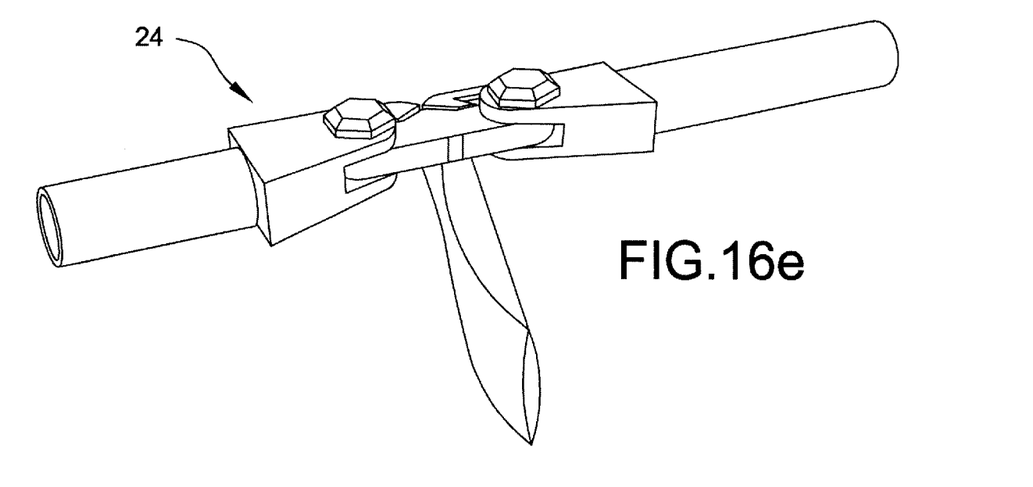

As shown, the tire 13 is specifically designed with a molded attachment groove 35 running the circumferential length of the interior surface of the tire. Turning additionally to FIGS. 14 and 15, the tire 13 further includes a plurality of spaced apart retaining clips 47 and a pair of go spaced apart tension members 45. Preferably, the tension members 45 are located adjacent either side of the groove 35 and comprise a cable. The clips 47 and cable 45 may be molded into the tire with the spaced apart clips connected to each other by the cables 45, such as by a threaded cable. The cable 45 and the retaining clips 47 help the tire 13 stay firmly attached to the disk segments 17 when the vehicle is used at high speeds and during cornering and maneuvering. FIG. 15 shows a perspective view of one retaining clip 47 connected to the cables 45. Alternatively, the clips 47 and cable 45 may be replaced with a single, preferably metallic or composite, circular structure which is also molded into the tire.

Each disk segment 17 is preferably pie shaped, although other shapes that will generally form a circular support disk may similarly be used. Each disk segment 17 further comprises a tongue portion 41 along a first radial side and a groove portion 43 along an opposing radial side. During assembly, the tongue portion 41 of a first disk segment 17 is coupled together with the groove portion 43 of an adjacent disk segment 17. Once all of the disk segments 17 are coupled together, a circular support disk is formed. This circular support disk is then secured to one side of the hub assembly 19.

The tongue 41 and groove 43 configuration advantageously allows the disk segments 17 to be assembled into the circular support disk without collapse and also provides rigidity and strength.

Figure 9:
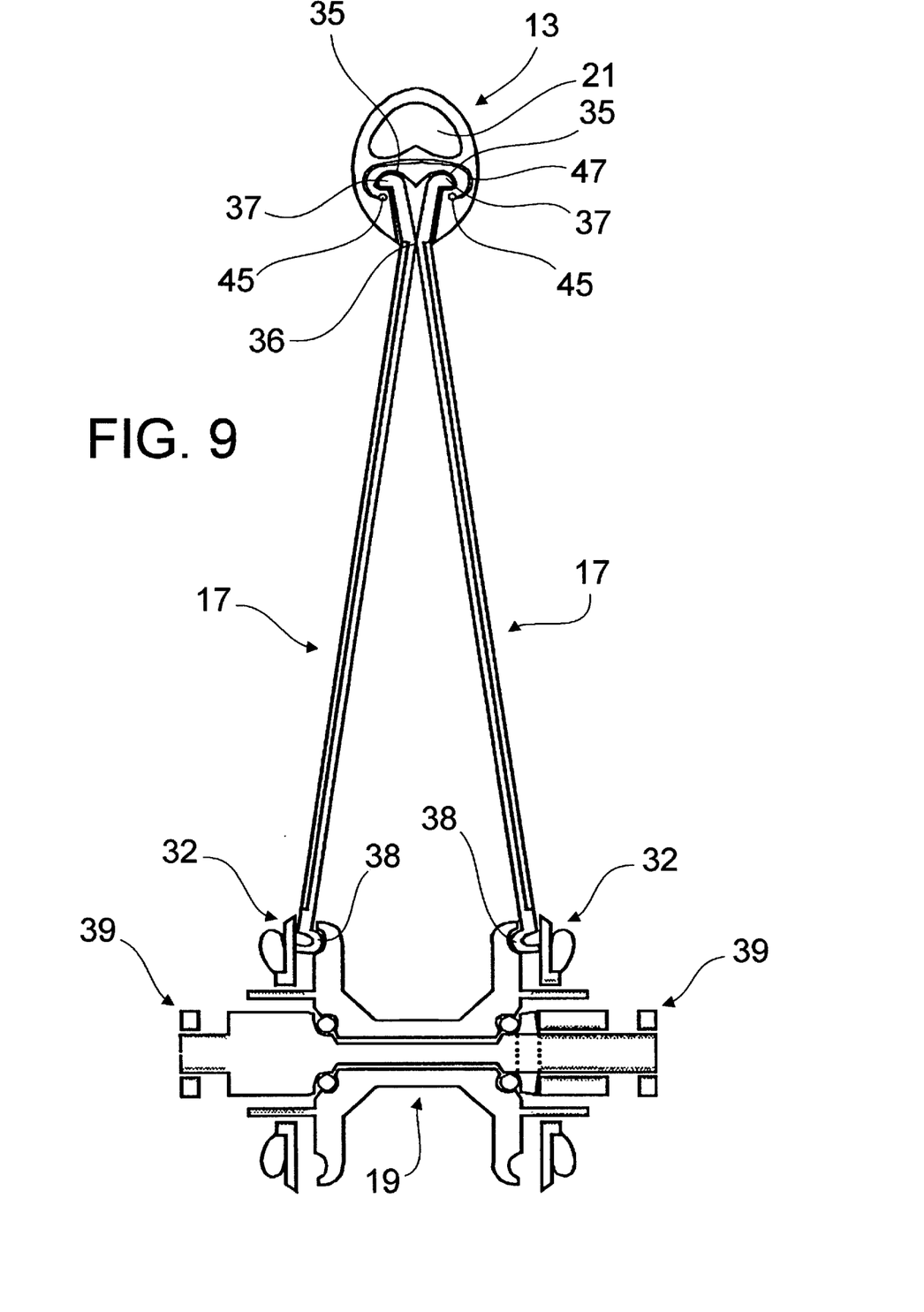
FIG. 9 is a semi-schematic partial sectional view of a portable front wheel assembly of the present invention.
Figures 10A, 10B:
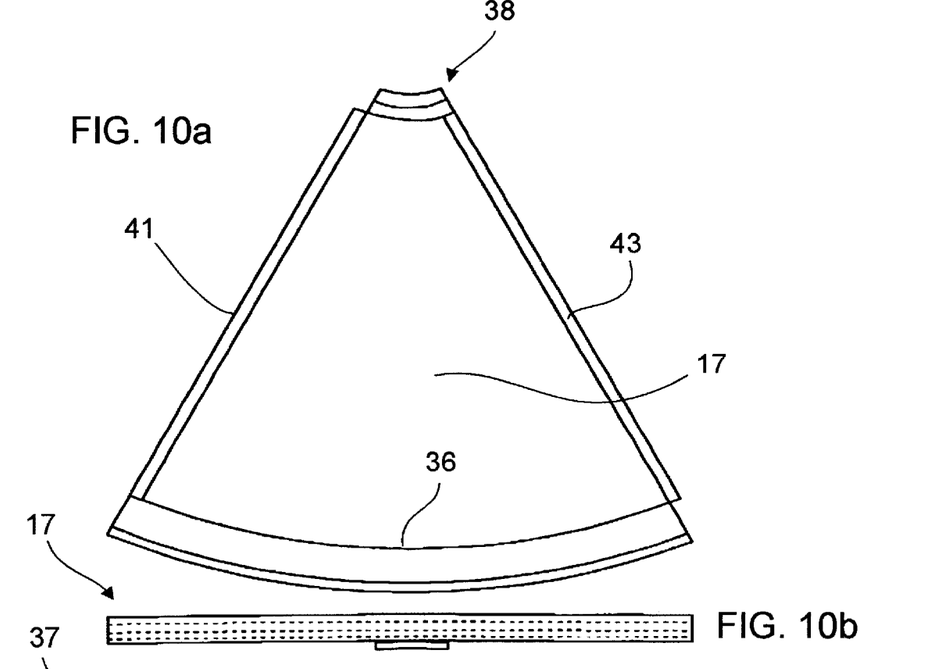
FIG. 10 illustrates the semi-schematic pie shaped segments of the supporting structure.
Figure 10C:
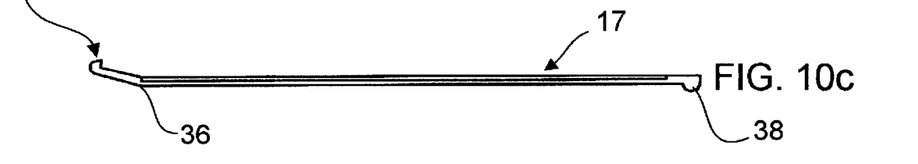
Figure 10D:
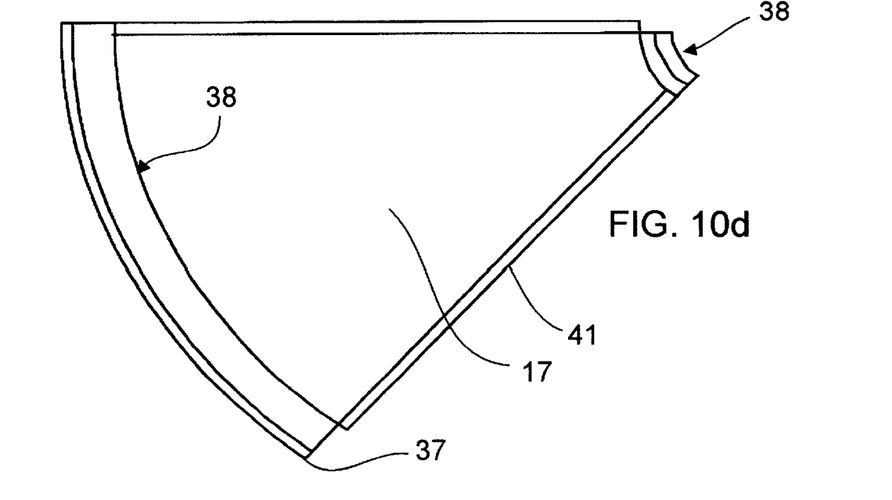
Figure 11:
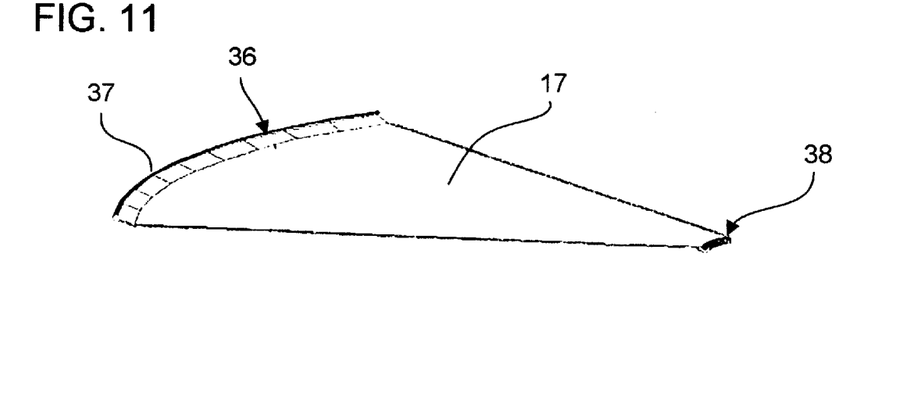
FIGS. 11–13 are various semi-schematic perspective views of the pie shaped segments of the supporting structure.
Figure 12:
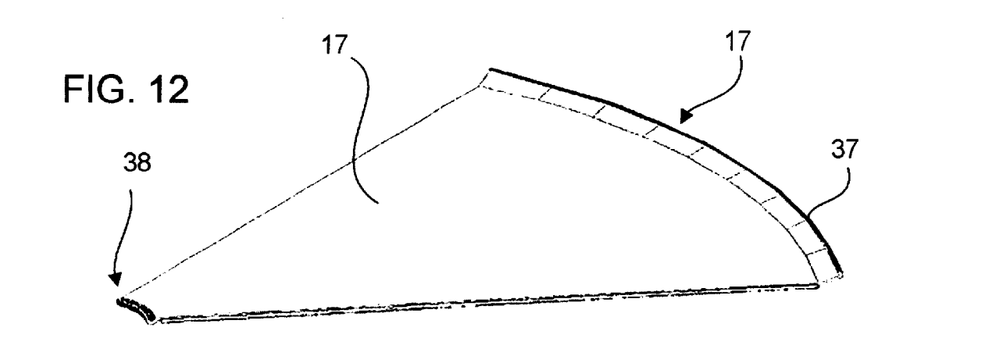
Figure 13:
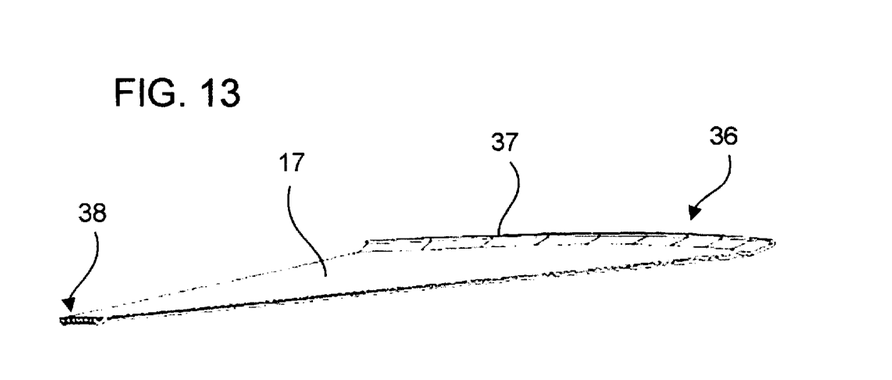

In the illustrated and preferred embodiment, a second support disk which is coaxial with the first support disk must also be provided. These two opposing support disks generally support the tire 13 and act to replace the conventional spoke assemblies. The second support disk is generally identical to the first support disk but oriented in an opposing direction as best illustrated in FIG. 9.

As shown, each disk segment 17 further comprises an angled or fulcrum portion 36. This portion 36 acts to contact the opposing support disk and force the opposing rim edges 37 or locking ridges 37 outwardly and into the tire groove 35. The rim edges 37 are forcibly locked into the groove 35 when the inner radial edge of the coupled disk segments are secured to the hub assembly 19. As can be seen, as the segments 17 are drawn into the hub assembly 19, the rim edges 37 are forced further apart, thus further engaging the groove 35 of the tire 13.

In the described front wheel assembly 10, a pair of outer retaining rings 32 or securement or locking rings secures the disk segments 17 to the front hub 19, by locking the ridge portion 38 to the hub 19. In the rear wheel assembly, an outer retaining ring or locking ring and an inner retaining ring secure the disk segments 17 to the rear gear hub 21. The rear gear hub 21 further comprises a gear or plurality of gears. The inner retaining ring may be different from the rear outer retaining ring due to the gear or gears. In the preferred embodiment, both the front and rear hub assemblies 19 and 21 further comprise internal bearings and are thus "free wheeling." The front and rear hubs 19 and 21 are secured to the bicycle frame 15 by hub securing nuts 39. Alternatively, instead of hub securing nuts 39, a "quick-release" type securing device as conventionally known and commonly used with conventional bicycles may be used.

Thus, the preferred embodiment of the present invention provides a portable wheel assembly 10 that can be quickly and easily assembled and disassembled and yet maintains the strength and performance of a more conventional full size wheel assembly. The portable wheel assembly 10 is adapted for unique and removable coupling with a tire 13 and with a framed vehicle such as a bicycle 12, wheelchair, unicycle or the like and that can be disassembled and stored in a compact arrangement, such as the specially configured container 26. The portable wheel assembly 10 comprises a hub assembly which is adapted for generally conventional rotatable movement about an axis.

A first plurality of pie shaped disk segments 17 are removably interlocked together along their radial sides to form a first circular support disk. Each of these first disk segment are removably coupled to a first side of the hub assembly 19 at an inner radial edge. The disk segments 17 are coupled together and extending radially outwardly from the hub assembly to form a circumferential first rim edge 37 along their outer radial edge.

A second plurality of pie shaped disk segments 17 are removably interlocked together along their radial sides to form a second circular support disk. This second support disk is coaxially aligned and opposing the first support disk. Each second disk segment is removably coupled to a second side of the hub assembly 19 at an inner radial edge and extends radially outwardly from the hub assembly to form a circumferential second rim edge along their outer radial edge 37. The first and second rim edges being spaced apart and adapted to couple with the tire 13. In addition, each support disk includes a curved or fulcrum portion which contacts the opposing fulcrum portion 36 during installation onto the hub assembly. First and second locking ring 31 are used to removably secure the respective inner radial edges of the first and second disk segments 17 to the respective first and second sides of the hub assembly 19.

As described, the portable wheel assembly preferably includes a tire. The tire is coupled to the rim edges 37. The tire 13 comprises a circular groove 35 along its inside or inner circumferential surface. A single, or alternatively a plurality of spaced apart and integral tension members 45 are aligned adjacent each circular side of the circumferential groove. A plurality of spaced apart retaining clips 47 are integrally formed within the tire and are coupled to the tension member or retaining cables 45. During assembly of the tire 13 onto the rim edges 37, when the first and second rim edges 37 are inserted into the circular groove 35 and when the first and second support disks 17 are attached to the hub assembly, this causes the opposing fulcrum portions 36 of the support disks 17 to contact each other and forcibly move the rim edges 37 outwardly to securely engage within the circular groove 35.

The portable wheel assembly 10 can also be collapsed or disassembled in a similar but reverse fashion and particularly, by unclamping the opposing support disks from each other and thus, uncoupling each support disk from the hub assembly 19 and uncoupling each disk segment 17 from each other. In a preferred embodiment, the tire 13 is used to further clamp the disks segments 17 together. The tire 13 is made of flexible synthetic rubber with multiple retaining clips 47 molded into the interior. As noted, the plurality of clips 47 and cable 45 may be replaced with a single tire retaining member. Preferably, the tire 13 is a non-pneumatic tire, but includes a closed annular passageway 21 or air chamber for ride cushioning.

The portable wheel assembly 10 has at least two advantages in its construction. The first is size. The portable wheel assembly 10 is a preferably conventionally sized bicycle wheel. Most folding bicycles have very small wheels due to the size constraints involved in trying to fit a rideable bicycle into a suitcase. When disassembled the wheel assembly 10 fits into a medium size suitcase 26 along with a folding bicycle frame 12. These, among other features, allow a person to have a full size bicycle which fits into a suitcase.

As illustrated, the portable wheel assembly 10 consists of a front wheel with a free wheeling front assembly 19. Two wing nut type locking segment rings 32 secure fourteen pie shaped tongue and groove disk segments 17. The fulcrum portions 36 of the disk segments 17 are located at the radially outward end of the pie shape. The purpose of the fulcrum portions is to bite and spread the tire 13 and to secure the flexible tire 13 on the wheel 10. The tire 13 is specially designed with a molded attachment groove 35 running the length of the interior rim. Two thin cables 45 run on each side of the groove 35. Attached to these cables are retaining clips 47 which are also molded into the tire 13. Once disassembled, the tire 13 can be folded over several times to fit into a small area.

Figures 5, 6B:
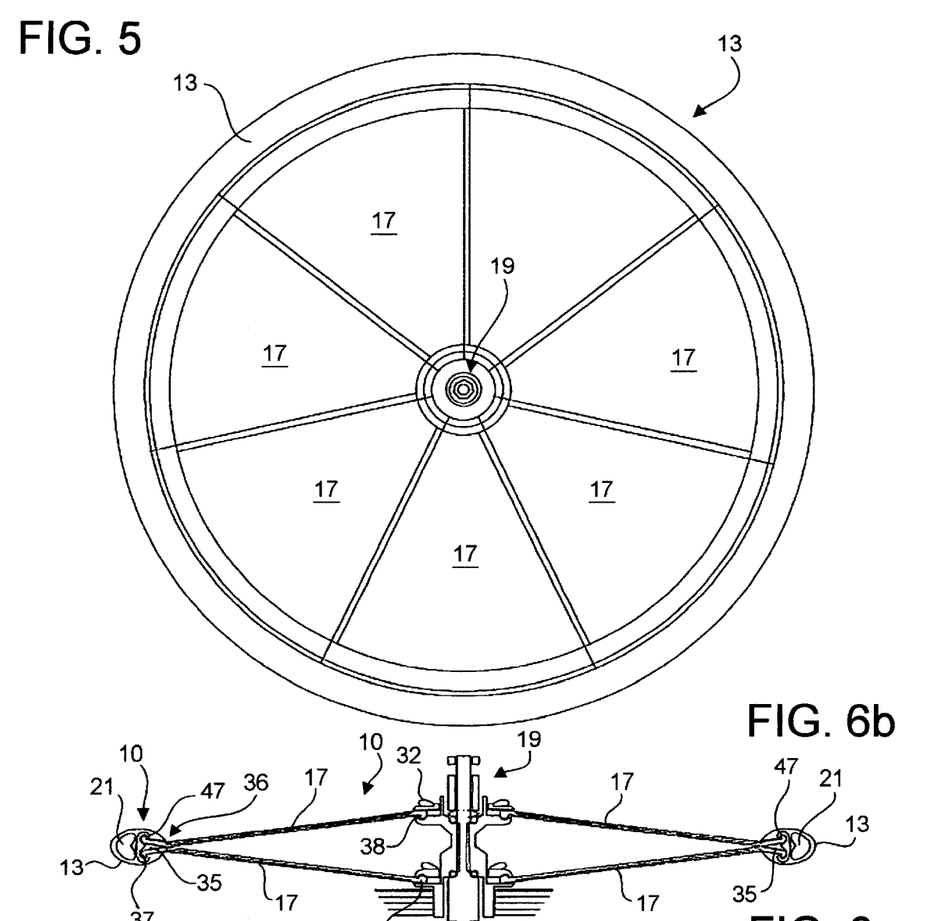
FIG. 5 is a semi-schematic side view of a portable wheel assembly constructed according to the principles of the present invention.
FIG. 6b is a semi-schematic top sectional view looking down on the rear portable wheel assembly of FIG. 3.
Figure 6A:
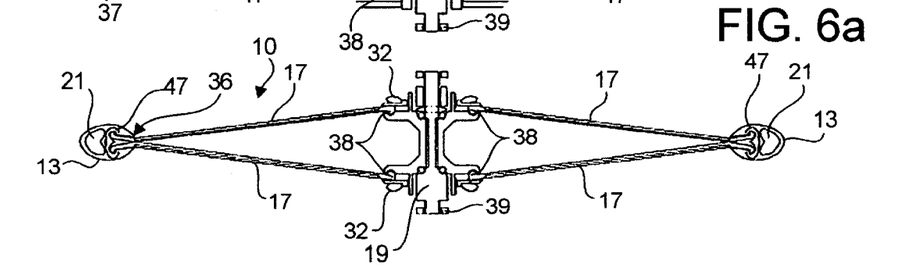
FIG. 6a is a semi-schematic top sectional view looking down on the front portable wheel assembly of FIG. 3.
Figures 7A, 8A:
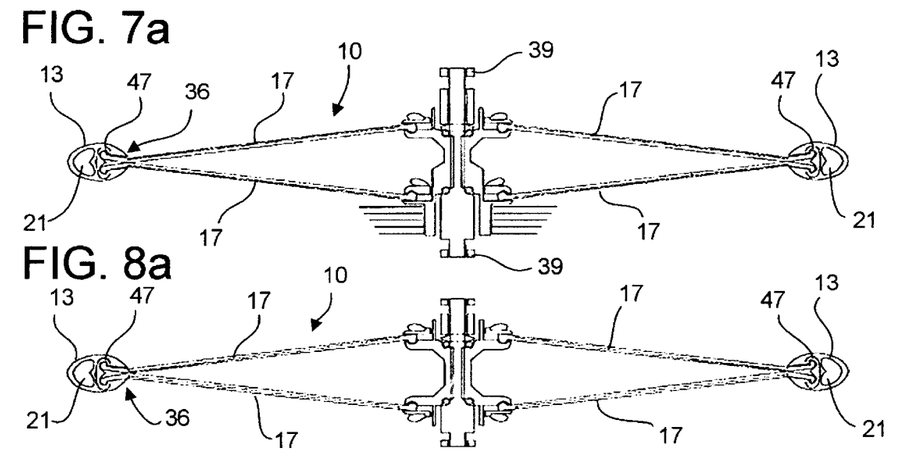
FIGS. 7a–7b are semi-schematic sectional views of an embodiment of a rear portable wheel assembly of the present invention showing the attached gear assemblies.
FIGS. 8a–8b are semi-schematic sectional views of an embodiment of a front portable wheel assembly of the present invention.
Figure 7B:
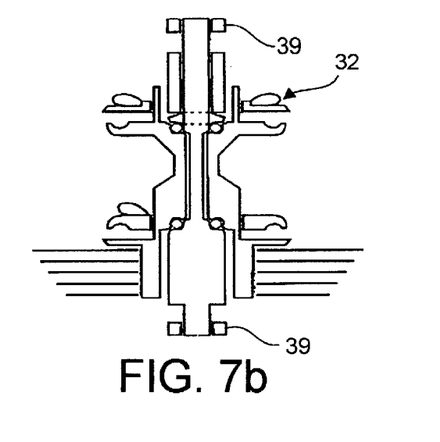
Figure 8B:
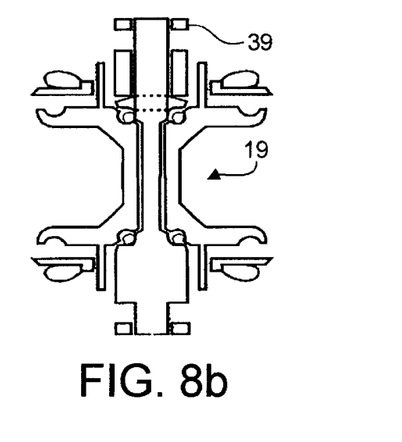

The pie shaped tongue and groove disk segments 17 have a retaining groove as best shown in FIG. 9 or, alternatively, may have a ridge 38 as shown in FIGS. 6 and 7 at the inner radial end. The retaining ridges 38 fits onto the hub and are secured by the threaded locking rings 32. The rings 32 have wings on their surface for quick attachment. At the other end of the disk segments 17 are the fulcrum portions 36. The fulcrum portions 36 have a hooked end or rim edge 37 at the outer radial edge. The hook 37 cups under one of the two cables 45 on either side of the running insertion groove 35. When two opposing disk segments 17 come together they pivot at their fulcrums portions 36. The hooked ends 17 lever apart and bite into the tire 13 within the groove 35.

It will be understood that various modifications and alternatives can be made to the present invention herein disclosed without departing from the spirit and scope thereof. For example, various types, combinations and formulations of lightweight materials may be used and these materials may be used for different portions of the portable wheel assembly. Also, various modifications may be made in the size, thickness, shape, diameter and configuration of the parts and their interaction as well as various overall configurations, including most any variation of the pie shaped segments. Therefore, the above description should not be construed as limiting the invention, but merely an exemplification of preferred embodiments thereof. Those of skill in the art will envision other modifications within the scope and spirit of the present invention as defined by the claims appended hereto.

What is claimed is:

1. A wheel assembly for supporting a tire, the wheel assembly comprising:
   a hub assembly adapted for rotatable movement about an axis;
   a first plurality of disk segments coupled together along their radial sides to form a first circular support disk, each disk segment removably coupled to the hub assembly at an inner peripheral radial edge and extending radially outwardly from the hub to form a first portion of a circular rim at an outer peripheral radial edge; and
   a second plurality of disk segments coupled together along their radial sides to form a second circular support disk concentrically aligned and opposing the first support disc, each second support disk segment removably coupled to an opposing side of the hub assembly at an inner radial edge and extending radially outwardly from the hub assembly to form a second portion of the circular rim at an outer radial edge, wherein the first and second rim portions are aligned to form opposing circular edges for coupling with the tire.

2. The wheel assembly as recited in claim 1, and further comprising a pair of locking rings, wherein the inner radial edge of both the first and the second support disks are coupled to the hub assembly by a respective one of the locking rings.

3. The wheel assembly as recited in claim 1 wherein the hub assembly is adapted as a conventional rear bicycle hub assembly and includes a substantially conventional bicycle gear assembly.

4. The wheel assembly as recited in claim 1 wherein the hub assembly includes a rotatably supported axle.

5. The wheel assembly as recited in claim 1 wherein each of the support segments comprises an aluminum alloy.

6. The wheel assembly as recited in claim 1 wherein each of the disk segments comprises a pie shaped disk having a tongue portion along one radial side and a groove portion along the opposite radial side, each tongue portion being adapted to interlock with an adjacent groove portion to form a continuous section of the circular support disk.

7. The wheel assembly as recited in claim 6 wherein the wheel assembly further comprises a tire which is adapted to attach the outer radial edge of each respective circular support disk.

8. A portable wheel assembly for supporting a tire, the wheel assembly comprising:
- a hub assembly adapted for rotatable movement about an axis; and
- a first plurality of pie shaped disk segments removably interlocked together along their radial sides to form a first circular support disk, each disk segment removably coupled to a first side of the hub assembly at an inner radial edge and extending radially outwardly from the hub assembly to form a circumferential portion of a first rim edge at an outer radial edge;
- a second plurality of pie shaped disk segments removably interlocked together along their radial sides to form a second circular support disk concentrically aligned and opposing the first support disk, each second disk segment removably coupled to a second side of the hub assembly at an inner radial edge and extending radially outwardly from the hub assembly to form a circumferential portion of a second rim edge at an outer radial edge, the first and second rim edges being spaced apart and adapted to couple with the tire; and
- a first and second locking ring for locking the respective inner radial edges of the first and second disk segments to the respective first and second sides of the hub assembly.

9. The wheel assembly as recited in claim 8 wherein the support disks each define opposing fulcrum portions.

10. The wheel assembly as recited in claim 9, and further comprising a tire.

11. The wheel assembly as recited in claim 9 wherein the tire comprises:
- a circular groove along an inner circumferential surface;
- a integral tension member oriented adjacent the circumferential groove; and
- a plurality of spaced apart retaining clips, each of the retaining clips being coupled to the tension member,
- wherein the first and second rim edges are adapted for insertion into the circular groove and wherein attachment of the first and second support disks to the hub assembly causes the opposing fulcrum portions of each support disk to contact each other and forcibly move the rim edges outwardly and securely engage within the circular groove.

* * * * *